United States Patent [19]

Rosenbaum et al.

[11] 4,396,869

[45] Aug. 2, 1983

[54] TIME RESPONSIVE VARIABLE VOLTAGE POWER SUPPLY

[75] Inventors: Saul Rosenbaum, East Meadow; Howard S. Leopold, Plainview; Bernard Gershen, Centerport, all of N.Y.

[73] Assignee: Leviton Manufacturing Company, Inc., Little Neck, N.Y.

[21] Appl. No.: 183,592

[22] Filed: Aug. 27, 1980

Related U.S. Application Data

[63] Continuation of Ser. No. 17,513, Mar. 5, 1979, abandoned.

[51] Int. Cl.³ .............................................. H05B 37/02
[52] U.S. Cl. .................................. 315/194; 315/199; 315/291; 315/362; 323/322
[58] Field of Search .............. 315/194, 199, 291, 362, 315/DIG. 4; 307/252 UA; 323/322, 904, 905

[56] References Cited

U.S. PATENT DOCUMENTS 3,991,343 11/1976 Delpy ..................... 315/194
4,087,702 5/1978 Kirby et al. ............. 315/194 X

OTHER PUBLICATIONS

*Digital MOS-Sensor-Dimmer with IC S566B,* Siemans Application Note MSR/P -7707/19, Mar. 4, 1978.

*Primary Examiner*—Eugene R. LaRoche
*Attorney, Agent, or Firm*—Paul J. Sutton

[57] ABSTRACT

A variable voltage power supply includes a switching device through which line AC current is passed in response to the time during which a level setting voltage is applied to a control circuit for the switching device. During the duration of the level setting signal, periodic electrical signals are applied to a counter which is cyclicly incremented and decremented between predetermined lower and upper count limits until the level setting signal is terminated. The count is used as a measure of time into each half cycle of the line AC voltage at which the switch device is closed, the switch device being opened in response to the zero voltage crossing at the end of each half cycle of the AC voltage.

7 Claims, 1 Drawing Figure

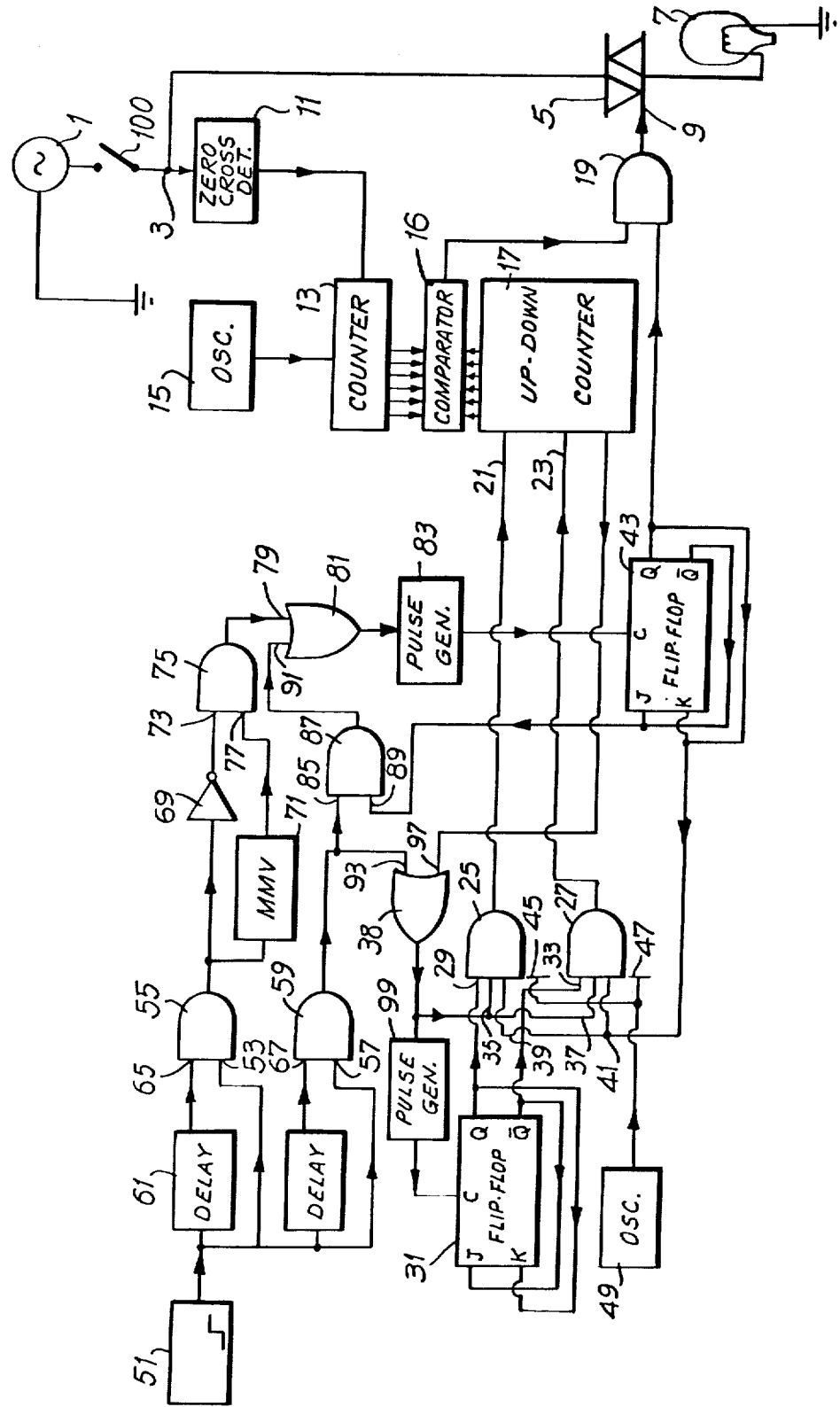

TIME RESPONSIVE VARIABLE VOLTAGE POWER SUPPLY

This is a continuation of application Ser. No. 17,513, filed Mar. 5, 1979, abandoned.

BACKGROUND OF THE INVENTION

The instant invention pertains to the art of variable voltage AC power supply having an input at which an AC voltage is applied and an output at which a voltage of variable magnitude can be used to power an appliance. The type of variable voltage power supply with which the invention deals applies particularly to devices used for dimming incandescent lights in a plant or residence.

Various types of devices for dimming lights are known to the art including variable transformers, rheostats and those employing high-speed switching devices such as silicon-controlled rectifiers and triacs.

In prior art devices employing high-speed switching devices to disconnect the line voltage from the appliance during portions of the alternating voltage cycle, a control must normally be turned or otherwise moved to a position consistent with the turn-on point of the switching device in the AC cycle. Although useful for some applications, these devices have shortcomings which render them difficult to use in others. For example, if the level of light is to be controlled from a remote location, radio controlled servo-motors must be used to position the control. Prior art devices also do not lend themselves to use with touch-actuated controls which can provide a constant voltage signal during the duration of a pressure, temperature or body capacitance applied to the surface of the controls. Such controls, in addition to their utility, are aesthetically pleasing particularly when used in modern decors.

SUMMARY OF THE INVENTION

The instant invention teaches the construction and use of a variable voltage power supply having an input adapted to be connected to an alternating voltage and an output, a latching switch means having one terminal connected to the input and another terminal connected to the output and a control terminal to which a control voltage is applied for latching the switch in a closed condition at a preset time in a sub-cycle of the line-alternating voltage. The switch means changes to an open state from a closed state to interrupt current flow to the output of the power supply during the zero crossing which terminates the alternating voltage sub-cycle. The control circuit includes a source of periodic signals and a counter to which signals are applied for incrementing and then decrementing the count in the counter between lower and upper counting limits in response to application of a level-setting constant voltage signal applied to an input of the control circuit for a period of time until the desired output voltage of the power supply is reached. A second counter receives periodic signals from a second source and cyclicly counts a number of pulses equal to the count range between the upper and lower limits in the first counter within the time of a single sub-cycle of alternating voltage applied to the input of the power supply. Each time a match is made between the count in the two counters a control signal is applied to the control input of the switch means to render the switch conductive until the end of the alternating voltage sub-cycle.

Circuitry provides for incrementing the first counter up to the upper limit and then decrementing it down to the lower limit and repeating the cycle as long as the level-setting voltage is applied to the input of the control circuit. Means are also provided for reversing the direction in which the first counter counts each time the level-setting voltage is interrupted and then reapplied. Further means prevents the switching device from conducting each time the level-setting voltage is applied while the power supply is turned on to permit the same control motions by the user to alternately turn the power supply on and off. Each time the power supply is turned on the output voltage is at its last level in the previous on-cycle by virtue of the count stored in the first counter.

It is, therefore, an object of the invention to provide a variable voltage AC power supply having an output voltage variable in increasing and decreasing directions in response to the time during which a constant voltage level-setting signal is applied.

Another object of the invention is to provide a variable voltage AC power supply which, when initially actuated, produces an output voltage equal to the last produced output voltage.

Still another object of the invention is to provide a variable voltage AC power supply which can alternately be turned on and off by the same control motion.

A further object of the invention is to provide a variable voltage AC power supply wherein the direction of variation of voltage reverses with respect to the last direction of variation of voltage each time the power supply is turned on.

Other and further objects of the invention will be apparent from the following drawings and description of a preferred embodiment in which like reference numerals are used to designate like parts in the various views.

DESCRIPTION OF THE DRAWINGS

FIG. 1 is a schematic diagram of the circuitry of the preferred embodiment of the invention.

DESCRIPTION OF THE PREFERRED EMBODIMENT

Referring now to the drawing, there is shown a standard AC voltage source 1 which can be, for example, the line voltage supplied to a residence or commercial building which is connected to an input terminal 3 of the variable voltage AC power supply of the invention. The input terminal 3 is connected through a triac 5 to a load 7 which can be an incandescent lamp. The triac 5, as will be known to those skilled in the art, has a control input 9 adapted to receive a voltage signal for rendering the triac conductive. The triac, as will be further known, is a latching switch device which remains conductive while a current is flowing through it until current flow ceases as, for example, during the zero crossing or change of polarity of an AC current passing through it. The triac then becomes non-conductive until once again latched into conduction by application of a suitable pole at the control input 9.

A zero crossing detector circuit 11 has an input which is also connected to the alternating voltage source 3 and an output which is connected to the reset input of a counter 13. The zero crossing detector circuit provides an output signal whenever the voltage of the source 3 changes polarity between positive and negative thereby assuming a momentary zero value. Zero crossing detectors of this type are conventional and known to those skilled in the art.

Connected to the counting input of the counter 13 is the output of an oscillator 15 which has a frequency equal to the product of twice the frequency of the AC voltage source 3 and the number of discrete output voltage levels which are to be supplied at the output of the variable voltage AC power supply. The reason this frequency is chosen for the oscillator 15 will be apparent later in the disclosure when the functioning of the remaining circuitry is explained.

The counter 13 counts the output signals from the oscillator 15 which are supplied at the previously-defined frequency which in the case of a 60-cycle per second line connected to a variable voltage power supply according to the invention which has 64 output voltage levels is 7,680 cycles per second. The counter 13 counts the signals from the oscillator 15 ascendingly from zero to 64 and then automatically resets to zero and counts again to 64, the cycle being repeated as long as output signals are supplied by the oscillator 15. In this manner, the counter counts from zero to 64 once during each half cycle of the 60-cycle AC voltage of the source 3. The count is repeated during each sub-cycle which in the case of the sinosoidal AC voltage is selected to be a half cycle of the AC voltage. The output of the zero crossing detector 11 resets the counter 13 to zero for a new count to 64 at the commencement of each sub-cycle of the AC voltage.

The counter 13 is a conventional six-bit counter which can count 64 steps. The counter 13 has a six-bit output which is connected to one input of a comparator 16. Another input of the comparator 16 is connected to the output of an up-down counter 17 which has respective incrementing and decrementing inputs and a six-bit output which is applied to the corresponding input of the six-bit comparator 16. The comparator 16 has an output connected to one input of an AND gate 19. Whenever the six-bit output of the counter 13 is identical to the six-bit output of the up-down counter 17, the comparator output is at one voltage equivalent to a logical "one". When the six-bit outputs of the counters 13 and 17 respectively differ, the output signal generated by the comparator 16 is a different voltage which is equivalent to a logical "zero".

Each time a signal is applied to the incrementing input of the up-down counter 17 on line 21, the count in the up-down counter 17 is incremented by one. Each time a signal is applied on line 23 to the decrementing input the count in the up-down counter 17 is decremented by one.

Incrementing and decrementing signals are applied to the up-down counter 17 on lines 21 and 23 respectively by respective and gates 25 and 27 each of which has four inputs. In order for an incrementing signal to appear on line 21 or for a decrementing signal to appear on line 23, each of the inputs to the respective AND gates 25 and 27 must be equivalent to a logical "one". The signals applied to the incrementing input of the up-down counter 17 on line 21 are employed to decrease the output voltage of the variable voltage AC power supply of the invention and the signals on line 23 applied to the decrementing input are used to increase the power supply output voltage as will subsequently be explained.

The first of the input 29 of the AND gate 25 is connected to the Q output of a bi-stable multi-vibrator or flip-flop 31. The first of the inputs 33 to the AND gate 27 is connected to the $\overline{Q}$ output of the flip-flop 31 which is always equal to the inverse of the Q output. With this arrangement, it will be appreciated that the output of AND gates 25 and 27 can never both be equivalent to logical "one" at the same time and hence the up-down counter 17 will never receive incrementing and decrementing signals simultaneously.

A second input 35 to AND gate 25 and a second input 37 to AND gate 27 are both connected to the output of an OR gate 38. Hence the respective signals on the second inputs 35 and 37 to AND gates 25 and 27 respectively are always the same. A third input 39 to AND gate 25 and a third input 41 to AND gate 27 are each connected to the K output of a bi-stable multi-vibrator or flip-flop 43. Hence the signals applied to the respective inputs 39 and 41 of AND gates 25 and 27 are also always the same. The fourth input 45 to AND gate 25 and the fourth input 47 to AND gate 27 are each connected to the output of a constant frequency oscillator 49. Hence the signals at the inputs 45 and 47 to the respective AND gates 25 and 27 are again always the same.

The frequency of the oscillator 49 is equal to the number of output voltage levels which are desired to be available at the output of the variable voltage AC power supply, which in the case of the preferred embodiment is 64, divided by the time in which it is desired to have the output of the variable voltage power supply cycle between its lowest level and its highest level. For a cycle time from lowest voltage output to highest voltage output of 2½ seconds, as has been determined to be convenient. The frequency of the oscillator 49 is selected to be 64, divided by 2.5 seconds or 25.6 cycles per second.

A step function signal generator 51 having an output which is normally equivalent to the logical "zero" and changeable to a signal equivalent to a logical "one" when actuated to turn the variable voltage AC power supply on or off or to vary its level of voltage can be a simple switch connected to a DC voltage source but can take many forms as will be known to those skilled in the art. Preferably, the step function generator 51 includes a pressure or temperature sensitive switch which will actuate upon application of a light pressure or body temperature or body capacitance when touched by a person. The signal generator 51 provides the stepped output signal equivalent to a logical "one" as long as the generator is continuously actuated as, for example, by continuously touching a temperature-sensitive or pressure-sensitive surface of a switching device included therein.

The output of the stepped function signal 51 is connected directly to a first input 53 of an AND gate 55 and to a first input 57 of an AND gate 59. The output of the stepped function generator 51 is also connected to the input of a first delay circuit 61 and to the input of a second delay circuit 63. The output of the first delay circuit 61 is connected to a second input 65 of the AND gate 55. The output of the second delay circuit 63 is connected to a second input 67 of the AND gate 59. The first delay circuit 61 provides a 65 millisecond delay before producing at its output a stepped function signal similar to the one applied to its input from the output of the stepped function signal generator 51. A 65 millisecond delay is chosen for us in the case of a pressure-sensitive touch switch stepped function signal generator to prevent the output voltage of the variable voltage AC power supply from turning on and off during "finger bounce" wherein the pressure-sensitive switch surface may bounce several times when finger pressure is first applied before coming to rest in a stepped function generating position. That is, instead of a stepped function appearing at the output of the generator 51 when finger pressure is applied, a series of pulses may appear corresponding to the number of times the finger bounces on the surface. A 65 millisecond delay of the delay circuit 61 prevents such pulses which normally do not occur 65 milliseconds after the switch surface is first touched causing an input to be applied to the second input 65 of the AND gate 55.

The second delay circuit 63 imparts a delay of 370 milliseconds before reproducing the stepped voltage signal at its output for application to the second input 67 of AND gate 59. 370 milliseconds is selected for the delay time imparted by the delay circuits 63 as a dividing point between a momentary touch of the switching surface of the stepped function signal generator 51 and a continuous touching of the switching surface. A momentary touching of the switching surface of more than 65 milliseconds or less than 370 milliseconds results in the variable voltage AC power supply being turned on if it were previously off or off it it were previously on, as will subsequently be explained, while a continuous touching after the voltage supply was turned off, not only turns it on but effects a continuous change in the output voltage as long as pressure is applied to the pressure-sensitive surface of the stepped function signal generator 51. Thus, to vary the voltage output of the power supply, the switch of the signal generator 51 must be actuated for a period of greater than 370 milliseconds. Although 65 milliseconds and 370 milliseconds have been determined to be convenient times for respectively eliminating finger bounce problems and distinguishing between momentary and continuous touching of the switching surface, other times may be selected within the teachings of the invention. The construction of the delay circuits 61 and 63 to achieve the desired time delays will be known to those skilled in the art as these are conventional devices commonly used with digital circuitry.

From the foregoing, it will be seen that in order to obtain a signal at the output of the AND gate 55 equivalent to a logical "one" the step function signal generator 51 must be actuated for a period of time greater than 65 milliseconds so that signals equivalent to logical "one" appear at both inputs 53 and 65 to the AND gate 55.

The output of the AND gate 55 is connected to the input of an inverting amplifier having a unity gain and known to those skilled in the art as an inverter 69. The output of the inverter 69 is always equal to the inverse of the input to the inverter 69 so that when a signal equivalent to a logical one appears at the input to the inverter 69 the output of the inverter 69 is equivalent to a logical zero. Similarly, when the signal or lack of it at the input to the inverter 69 is equivalent to a logical zero, the output of the inverter 69 generates a signal equivalent to a logical one. The output of the AND gate 55 is also connected to the input of a monostable multivibrator or one-shot circuit 71 which generates a pulse at its output of 305 milliseconds duration in response to a signal equivalent to a logical "one" appearing at the input of the mono-stable multi-vibrator 71. The output of the inverter 69 is applied to a first input 73 of an AND gate 75 and the output of the monostable multivibrator 71 is connected to a second input 77 of the AND gate 75. A net effect of this arrangement is to provide a signal at the output of AND gate 75 equivalent to a logical "one" when the step function signal generator 51 is deactivated more than 65 milliseconds or less than 370 milliseconds after it is initially actuated. Only if the step function signal generator 51 is actuated for a period of time greater than 65 milliseconds can a logical one signal appear at the output of AND gate 55. This signal at the output of the AND gate 55 is necessary to actuate the monostable multi-vibrator 71 into producing at its output a 305 millisecond signal which is needed to provide a logical "one" signal at the output of AND gate 75. However, while the step function signal is appearing at the output of the step function signal generator 51 after passage of the 65 millisecond initial delay period, the signal at the input 73 to the AND gate 75 is equivalent to a logical "zero" due to the action of the inverter 69. Only when the step function signal generator 51 is deactuated during the occurrence of the 305 millisecond pulse at the output of the monostable multi-vibrator 71 do the signals at the inputs 73 and 77 of the AND gate 75 both become equivalent to logical "one" thereby enabling a logical "one" signal to appear at the output of AND gate 75. After 370 milliseconds has elapsed from the time the step function signal generator 51 is first actuated, the 305 millisecond pulse from the monostable multi-vibrator 71 terminates thereby preventing a logical "one" signal from appearing at the output of AND gate 75. The signal at the output of AND gate 75 controls the on-off function of the variable voltage AC power supply of the invention as follows.

The output of AND gate 75 is connected to the input 79 of an OR gate 81. The output of the OR gate 81 is connected to the input of a pulse generating circuit 83 which can be a monostable multi-vibrator or one-shot circuit. Whenever a signal equivalent to a logical one appears at the output of the AND gate 75, a similar signal appears at the output of the OR gate 81 thereby actuating the pulse generating circuit 83 to produce at its output a pulse which is applied to the clock input C of the bistable multi-vibrator 43. The bistable multi-vibrator 43 is wired with its J input connected to the Q output and the K input of the bistable multi-vibrator 43 is connected to the Q output. In this mode, every time a pulse transition occurs at the clock input C of the bistable multi-vibrator 43, the outputs at Q and $\overline{Q}$ invert. Thus, at the output Q was originally a logical one and the output at $\overline{Q}$ was, by necessity, a logical "zero" upon application of a pulse from the pulse generator 83 to the clock input C of the bistable multi-vibrator 43, the output signal at the Q terminal of the multi-vibrator 43 would change from logical one to logical zero and the output at $\overline{Q}$ would change from logical zero to logical one. As previously indicated, the Q output of the bistable multi-vibrator 43 is connected to one input of the AND gate 19, the other input of which is connected to the output of the comparator 16. The output of the AND gate 19 is connected to the control input 9 of the triac 5. Whenever a signal equivalent to a logical one appears at the output of the AND gate 19, the triac 5 is rendered conducting and the variable voltage power supply is turned on for the remaining duration of the instant subcycle of the alternating AC voltage applied to the triac 5. Hence, in order for the triac to be rendered conducting, a match must be made between the count in the counter 13 and the count in the up-down counter 17. As the count stored in the up-down counter 17 increases the triac 5 is rendered conducting at a later time in each alternating voltage subcycle and the root mean square voltage produced at the output of the variable voltage AC power supply is diminished. If a pulse appears at the clock input C of the bistable multi-vibrator 43 while the Q output of the bistable multi-vibrator 43 has a logical "one" signal permitting triac to be rendered conducting by a match between the counters 13 and 17, the output signal at the Q terminal is inverted to a logical "zero" thereby preventing the triac from being rendered conducting upon the next occurrence of a match between the counts in the respective counters 13 and 17.

If the step function signal generator 51 is actuated for a period of time greater than 370 milliseconds, as previously indicated, the output of the AND gate 75 will remain at logical zero. However, a signal equivalent to a logical "one" will appear at the output of the AND gate 59 and will be applied to a first input 85 of an AND gate 87. The output of the AND gate 87 is connected to an input 91 of the OR gate 81. Hence, whenever a logical "one" signal appears at the output of the AND gate 87, a similar signal appears at the output of the OR gate 81 which is applied to the input of the pulse generating circuit 83 to cause the bistable multi-vibrator 43 to toggle, that is, to invert its output signals. The $\overline{Q}$ output of the bistable multi-vibrator 43 is connected to the second input 89 of the AND gate 87 so that a logical "one" signal can appear at the output of the AND gate 87 to actuate the pulse generator 83 only when the $\overline{Q}$ output signal of the bistable multi-vibrator 43 is a logical "one," that is, only when the triac 5 is prevented from being rendered conducting by matched counts in the counters 13 and 17, respectively, in which condition the variable voltage AC power supply is off. Hence, if the power supply is on and it is desired to vary the voltage of the output and not to turn off the power supply, the step function signal generator 51 can be actuated for a period of time more than 370 milliseconds during and after which the respective signals appearing at the outputs of AND gates 75 and 87 will both have a value of logical "zero" thereby preventing the pulse generator 83 from toggling the bistable multi-vibrator 43 thereby permitting the triac to continue being conductive in each succeeding subcycle of the alternating voltage from the time a match occurs between the counts in the counters 13 and 17.

The output of AND gate 59 is connected to a first input 93 of an OR gate 38 and an end-of-count output of the up-down counter 17 is connected to a second input 97 of the OR gate 38. The output of the OR gate 38 is connected to the input of a pulse generator circuit 99 which can be a mono-stable multi-vibrator. The output of the pulse generator circuit 99 is connected to the clock input of the bistable multi-vibrator or flip-flop 31. The bistable multi-vibrator 31 has its J input wired to the $\overline{Q}$ output and the K input wired to the Q output in a manner similar to the bistable multi-vibrator or flip-flop 43 and functions similarly to the flipflop 43 in that each time a pulse is applied to the clock input C of the multi-vibrator 31 the mutually opposite signals at the Q and $\overline{Q}$ outputs are inverted.

As previously explained in connection with the discussion of AND gates 25 and 27, depending upon the signals at the Q and $\overline{Q}$ outputs of the flip-flop 31, one and only one of the AND gates 25 and 27 is capable of passing pulses supplied at its input. The pulses which are used for incrementing and decrementing the up-down counter 17 are provided by the constant frequency oscillator 49. The flip-flop 31 controls whether the up-down counter 17 is incremented or decremented by the pulses emanating from the oscillator 49. When the Q output has a logical value of "one" and the $\overline{Q}$ output has a logical value of "zero", only incrementing pulses can be applied to the up-down counter 17. Similarly, when the Q output has a logical value of "zero" and the $\overline{Q}$ output of the fli-flop 31 has a logical value of "one", only decrementing pulses can be applied to the up-down counters 17.

The alternating voltage provided at the output of the variable voltage AC power supply can be varied between zero volts and the maximum line voltage in any number of discrete steps. In the example of the preferred embodiment, sixty-four steps were chosen, the voltage levels associated with adjacent steps being so close together as to, for most practical purposes, give the equivalent of a continuous voltage variation particularly when used for dimming incandescent lamps. With the power supply off, the flip-flop 43 is in its one bistable state wherein the output signal at $\overline{Q}$ is a logical "one" and the output at the Q terminal is a logical "zero". As previously explained, this prevents the triac 5 from being rendered conductive. To turn the power supply on as, for example, to light a lamp, the step function signal generator is actuated as by touching it momentarily for a period of time greater than 65 milliseconds but less than 370 milliseconds. This causes a pulse to be generated by the pulse generator 83 in response to a logical "one" signal appearing at the output of AND gate 75 thereby toggling the flip-flop 43 and providing a logical "one" signal to one input of the AND gate 19. At this time, the count in the up-down counter 17 is constant having a stored value equal to the last value obtained and the counter 13 is continuously counting between zero and sixty-four, the counter 13 being reset each time a zero crossing of the AC voltage is detected by the zero crossing detector 11. The time to count from zero to sixty-four is equal to the time of one-half cycle of the alternating voltage or the time between zero crossing. Each time the counter 13 reaches the count equal to the count stored in the up-down counter 17 a pulse is generated at the output of the comparator 16 and applied to the other input of the AND gate 19 thereby rendering the triac 5 conductive. The powersupply is turned on and has at its output an average voltage dependent upon the counts stored in the up-down counter 17. The higher the count in the up-down counter 17 the less is the output voltage of the power supply. To change the output voltage the step function signal generator is actuated for a period of time greater than 370 milliseconds at which time a pulse is generated by the pulse generator 99 toggling the flip-flop 31. Concurrently, a logical "one" pulse appears at the output of the OR gate 38 thereby enabling whichever of the AND gates 25 and 27 is connected to the output of the flip-flop 31 having a logical "one" value to transmit pulses from the oscillator 49 to either the incrementing or decrementing input of the up-down counter. If the voltage output of the power supply was last changed in an increasing direction, the toggling of the flip-flop will cause the pulses from the oscillator 49 to be applied to the AND gate 27 on line 23 to decrement the up-down counter. Similarly, if during the last voltage change the voltage was changed in a decreasing direction, toggling of the flip-flop 31 will result in a logical "one" value appearing at the Q output thereby enabling AND gate 25 to pass pulses from the oscillator 49 to the incrementing input of the up-down counter. If it is desired to reduce the voltage output and the flip-flop 31 is set so that the voltage output is increasing, all that need be done to reverse the direction is to interrupt the step voltage from the step function signal generator as, for example, by removing the hand from the touch sensitive surface of the pressure sensitive switch, and then to reactuate the step function signal generator, as by reapplying the hand, for a period of more than 370 milliseconds. This will toggle the flip-flop 31 again and change the direction of voltage variation by changing the direction in which the up-down counter counts between zero and sixty-four. While the step function signal generator 51 is being actuated after 370 milliseconds, the up-down counter counts and if the count is an ascending one, a match is made with the count in the count of thirteen later into half cycles of the alternating voltage thereby shortening the time during each half-cycle during which the triac conducts. If the counter is counting in a descending direction, matches are made between the count in the count of thirteen and the counter 17 successively earlier in succeeding alternating voltage subcycles thereby increasing the time in each half cycle in which the triac is rendered conductive and, hence, increasing the output voltage of the variable voltage power supply. Once the desired voltage level at the output is reached, the step function signal generator 51 is deactivated, by removing the hand from the switch, thereby terminating the step signal at which time there is a cessation of incrementing and decrementing pulses to the up-down counter and the count in the up-down counter remains constant and, therefore, so does the output voltage. To turn the power supply off, the step function signal generator 51 is actuated for a brief period of time between 65 milliseconds and 370 milliseconds thereby causing the flip-flop 43 to toggle and the output of the AND gate 19 to go to logical "zero" whereby the triac can no longer be rendered conducting upon occurrence of a match in the counts of the counters 13 and 17.

A conventional air gap switch 100 which can be mechanically actuated can be connected in series between the power supply and the voltage source 1. The switch 100 is normally closed and the power supply is operated by actuating the step function signal generator 51. However, when it is desired to totally disconnect the power supply from the A.C. source 1, the switch 100 can be opened.

It will be appreciated that variations and alterations to the disclosed preferred embodiment of the invention can be made without departing from the spirit and scope of the invention.

What is claimed is:

1. A variable voltage power supply comprising:
   (a) an input adapted to be connected to an alternating voltage source;
   (b) an output;
   (c) latching switch means having a terminal connected to said input, another terminal connected to said output, and a control terminal adapted to have applied to it a switching signal for latching said switch means into a closed condition to permit current flow between said input and said output during a sub-cycle of said alternating voltage, said switch means switching to an open condition to prevent further current flow therethrough in response to completion of said sub-cycle of said alternating voltage; and
   (d) control means for latching said switch means into a closed condition during each said sub-cycle of said alternating voltage, said control means including:
      (1) means for generating a voltage level setting signal;
      (2) first counting means having an incrementing input and a decrementing input responsive to a first source of periodic electrical signals, said first counting means including means for storing a count representative of the last selected output voltage level during the last on output state of said power supply;
      (3) second counting means responsive to a second source of periodic electrical signals, said second counting means having a reset input responsive to the zero crossings of said alternating voltage;
      (4) comparing means for comparing the counts in said first and second counting means, respectively, said comparing means providing when the compared counts are equal said switching signal to said control terminal causing said switch means to latch into a closed condition and permitting current flow between said input and said output; and
      (5) timing means responsive to said voltage level setting signal for:
         a. inhibiting a change in output state of said power supply when the duration of said voltage level setting signal is less than a first predetermined period of time;
         b. effecting a change in output state of said power supply when the duration of said voltage level setting signal is greater than said first predetermined period of time and less than a second predetermined period of time; and
         c. effecting a change in output voltage level of said power supply when the duration of said voltage level setting signal is greater than said second predetermined period of time by selectively enabling one of said incrementing and decrementng inputs to said first counting means.

2. A variable voltage power supply according to claim 1 wherein said control means further comprises means for reversing the direction in which said first counting means counts each time said voltage level setting signal is interrupted and then reapplied.

3. A variable voltage power supply according to claim 2 wherein said signal generating means is configured to be user-activated and to provide a voltage level setting signal having a duration which is a function of user activation time.

4. A variable voltage power supply comprising:
   (a) an input adapted to be connected to an alternating voltage source;
   (b) an output;
   (c) latching switch means having a terminal connected to said input, another terminal connected to said output, and a control terminal adapted to have applied to it a switching signal for latching said switch means into a closed condition to permit current flow between said input and said output during a sub-cycle of said alternating voltage, said switch means switching to an open condition to prevent further current flow therethrough in response to completion of said sub-cycle of said alternating voltage; and
   (d) control means for latching said switch means into a closed condition during each said sub-cycle of said alternating voltage, said control means including:

(1) a user-activated voltage level setting signal generator having a control surface input adapted to be touched for a period of time and an output at which a voltage level setting signal appears in response to and during the period of time said control surface is touched;

(2) an n-stage up-down counter having an incrementing input and a decrementing input responsive to a first source of periodic electrical signals, said up-down counter including means for storing a count representative of the last selected output voltage level during the last on output state of said power supply;

(3) an n-stage cyclical counter responsive to a second source of periodic electrical signals, said cyclical counter having a reset input responsive to the output of a zero crossing detector, the input to said zero crossing detector being responsive to said alternating voltage;

(4) an n-stage comparator for comparing the counts in said up-down and cyclical counters, respectively, said comparator providing when the stored count in said up-down counter equals the count in said cyclical counter said switching signal to said control terminal causing said switch means to latch into a closed condition and permitting current flow between said input and said output; and (5) timing means responsive to said voltage level setting signal for:
  a. inhibiting a change in output state of said power supply when the duration of said voltage level setting signal is less than a first predetermined period of time;
  b. effecting a change in output state of said power supply when the duration of said voltage level setting signal is greater than said first predetermined period of time and less than a second predetermined period of time; and
  c. effecting a change in output voltage level of said power supply when the duration of said voltage setting signal is greater than said second predetermined period of time and the output state of said power supply is on by selectively enabling one of said incrementing and decrementing inputs to said up-down counter, whereby enabling of said incrementing input causes said switch means to latch into a closed condition later in said sub-cycle of alternating voltage and enabling of said decrementing input causes said switch means to latch into a closed condition earlier in said sub-cycle of alternating voltage.

5. A variable voltage power supply according to claim 4 wherein said control means further comprises means for reversing the direction in which said up-down counter counts each time said voltage level setting signal is interrupted and then reapplied.

6. A variable voltage power supply according to claim 5 wherein said control means further comprises gating means for selectively applying said switching signal to said control terminal.

7. A variable voltage power supply according to claim 6 configured to provide $2^n$ discrete output voltage levels wherein said first source of periodic electrical signals comprises a first oscillator having a frequency which is determined by dividing the number of power supply output voltage levels, $2^n$, by the time desired for the power supply output voltage to cycle between its lowest and highest output voltage levels; and said second source of periodic electrical signals comprises a second oscillator having a frequency which is determined by multiplying the number of power supply output voltage levels, $2^n$, by twice the frequency of the alternating voltage source.

* * * * *